(12) United States Patent
Park

(10) Patent No.: US 12,477,318 B2
(45) Date of Patent: Nov. 18, 2025

(54) ELECTRONIC DEVICE AND METHOD FOR USING CACHED DATA BASED ON SUBSCRIBER IDENTIFICATION INFORMATION IN ELECTRONIC DEVICE

(71) Applicant: SAMSUNG ELECTRONICS CO., LTD., Suwon-si (KR)

(72) Inventor: Daesoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 539 days.

(21) Appl. No.: 17/953,722

(22) Filed: Sep. 27, 2022

(65) Prior Publication Data

US 2023/0017289 A1   Jan. 19, 2023

Related U.S. Application Data

(63) Continuation of application No. PCT/KR2021/003559, filed on Mar. 23, 2021.

(30) Foreign Application Priority Data

Mar. 27, 2022   (KR) ........................ 10-2020-0037596

(51) Int. Cl.
*H04W 8/18*       (2009.01)
*H04W 12/06*      (2021.01)
(Continued)

(52) U.S. Cl.
CPC ........... *H04W 8/183* (2013.01); *H04W 12/06* (2013.01); *H04W 12/72* (2021.01); *H04W 88/06* (2013.01)

(58) Field of Classification Search
None
See application file for complete search history.

(56) References Cited

U.S. PATENT DOCUMENTS 6,052,597 A * 4/2000 Ekstrom ............... H04W 64/00
                                              342/450
2007/0222735 A1   9/2007 Tak
(Continued)

FOREIGN PATENT DOCUMENTS

KR      10-0735341         7/2007
KR   10-2010-0002582       1/2010
(Continued)

*Primary Examiner* — Gary Lafontant
(74) *Attorney, Agent, or Firm* — NIXON & VANDERHYE P.C.

(57) ABSTRACT

According to various embodiments, an electronic device comprises: a communication circuit; a first subscriber identification module (SIM) comprising subscriber identification circuitry and including information for providing a first communication service; a memory; and at least one processor operatively coupled to the communication circuit, the first SIM, and the memory, wherein the memory can store instructions that when executed, cause the at least one processor to: check whether first SIM (SIM) data cached in the memory being valid in association with the information for providing the first communication service of the first SIM at initialization based on the first SIM; perform initialization associated with the first SIM using the first cached SIM data based on the first cached SIM data being valid; and perform initialization based on the first SIM using the first SIM data associated with the information for providing the first communication service from the first SIM based on the first cached SIM data not being valid.

15 Claims, 11 Drawing Sheets

(51) Int. Cl.
*H04W 12/72* (2021.01)
*H04W 88/06* (2009.01)

(56) References Cited

U.S. PATENT DOCUMENTS

| | | |
|---|---|---|
| 2009/0325641 A1 | 12/2009 | Lee et al. |
| 2014/0057679 A1 | 2/2014 | Berionne et al. |
| 2015/0087269 A1 | 3/2015 | Lee et al. |
| 2015/0133196 A1* | 5/2015 | Sen ........................ H04W 8/183 |
| | | 455/558 |
| 2019/0297490 A1 | 9/2019 | Yang |
| 2020/0128397 A1 | 4/2020 | Lee et al. |

FOREIGN PATENT DOCUMENTS

| | | |
|---|---|---|
| KR | 10-1059794 | 8/2011 |
| KR | 10-2018-0137140 | 12/2018 |
| WO | 2013/176502 | 11/2013 |

* cited by examiner

ELECTRONIC DEVICE AND METHOD FOR USING CACHED DATA BASED ON SUBSCRIBER IDENTIFICATION INFORMATION IN ELECTRONIC DEVICE

CROSS-REFERENCE TO RELATED APPLICATIONS

This application is a continuation of International Application No. PCT/KR2021/003559, designating the United States, filed on Mar. 23, 2021, in the Korean Intellectual Property Receiving Office and claiming priority to Korean Patent Application No. 10-2020-0037596, filed on Mar. 27, 2020, in the Korean Intellectual Property Office, the disclosures of which are incorporated by reference herein in their entireties.

BACKGROUND

Field

The disclosure relates to an electronic device and subscriber identification information in an electronic device.

Description of Related Art

In a wireless communication system, an electronic device (for example, also referred to as user equipment (UE) or mobile device) may access a wireless communication network and use a voice communication service or a data communication service in a fixed position or on the move. An appropriate authentication process is necessary to provide a communication service to an electronic device. A universal integrated circuit card (UICC) may be mounted or embedded in an electronic device and used for an authentication process. Functionally, the UICC includes those similar to an embedded UICC (eUICC) in which a profile for using a communication service can be downloaded and installed, but, physically, may include various types of UICCs detachably mounted in electronic devices or embedded in electronic devices. For example, the UICC may be equipped with a communication application of a subscriber identification module (SIM), a universal SIM (USIM), an IP multimedia SIM (ISIM), or a CDMA (code division multiple access) SIM (CSIM), depending on the type of the wireless communication network accessed by the subscriber, or may provide an upper-level security function for mounting various applications such as an electronic wallet, ticketing, and an electronic passport. In some cases, the UICC may be used interchangeably with the SIM (or plastic SIM (pSIM)), and the term eUICC may be used interchangeably with eSIM. The pSIM or eSIM may include information for receiving at least one communication service, such as international mobile subscriber identification (IMSI), the subscriber's network access authentication information, the subscriber's telephone book, the subscriber's personal information (SMS information, e-mail information, or SNS information), or information used to authenticate the subscriber and to generate a traffic security key when accessing a wireless communication network such as global system for mobile communications (GSM), wideband code division multiple access (WCDMA), or long term evolution (LTE), thereby enabling safe wireless communication use. For example, the IMSI may include a mobile country code (MCC), a mobile network code (MNC), a mobile subscriber identification number, and a mobile subscription identification number (MSIN).

An electronic device may directly access the SIM when booting or when initializing SIM (for example, pSIM or eSIM), thereby retrieving SIM data necessary to receive a communication service. The SIM data may include international mobile subscriber identification (IMSI), location information (Loci), public land mobile network (PLMN) information, phonebook-related information, or various other kinds of information. The electronic device may need to repeatedly retrieve SIM data when each booting or initializing SIM, and since the protocol used by the electronic device to access the SIM is based on a ISO 7816 based serial communication scheme, the access speed may be low. When the electronic device selectively uses multiple SIMs (for example, first SIM or second SIM) in a switching type, and when the electronic device uses the first SIM, uses the second SIM, again uses the second SIM, and again uses the first SIM, a long time may be taken in the course of repeatedly requesting first SIM data of the first SIM, receiving a response thereof, requesting second SIM data of the second SIM, and receiving a response thereof.

SUMMARY

Embodiments of the disclosure may provide an electronic device capable of using SIM data cached when previously initializing SIM without requesting SIM data and receiving a response therefrom when each booting or initializing SIM, and a method for using cached data based on subscriber identification information in an electronic device.

Embodiments of the disclosure may provide an electronic device wherein, when the electronic device selectively uses multiple SIMs, respectively, the electronic device can use SIM data cached when previously initializing SIM of each of the multiple SIMs without repeatedly requesting data from the multiple SIMs and receiving responses therefrom every time each of the multiple SIMs is used, and a method for using cached data based on subscriber identification information in an electronic device.

According to various example embodiments, an electronic device may include a communication circuit, a first subscriber identification module (SIM) comprising subscriber identification circuitry and including information for providing a first communication service, a memory, and at least one processor operatively connected to the communication circuit, the first SIM, and the memory, wherein the memory stores instructions which, when executed, cause the at least one processor to identify whether first SIM data cached in the memory being valid in association with the information for providing the first communication service of the first SIM when initializing based on the first SIM, based on the cached first SIM data being valid, perform initialization associated with the first SIM using the cached first SIM data, and based on the cached first SIM data not being valid, perform initialization based on the first SIM using first SIM data associated with the information for providing the first service from the first SIM.

According to various example embodiments, a method for using cached data based on subscriber identification information in an electronic device may include identifying whether first subscriber identification module (SIM) data cached in a memory being valid in association with information for providing a first communication service of a first SIM when initializing based on the first SIM, based on the cached first SIM data being valid, performing initialization associated with the first SIM using the cached first SIM data, and based on the cached first SIM data not being valid, performing initialization based on the first SIM using first SIM data associated with the information for providing the first communication service from the first SIM.

According to various example embodiments, a non-transitory computer-readable storage medium has stored thereon commands, the commands may, when executed by at least one processor, cause the at least one processor to perform at least one operation, and the at least one operation may include identifying whether first subscriber identification module (SIM) data cached in a memory being valid in association with information for providing a first communication service of a first SIM when initializing based on the first SIM, based on the cached first SIM data being valid, performing initialization associated with the first SIM using the cached first SIM data, and based on the cached first SIM data not being valid, performing initialization based on the first SIM using the first SIM data associated with the information for providing the first communication service from the first SIM.

According to example various embodiments, an electronic device may use SIM data cached when previously initializing SIM without retrieving SIM data when each booting or initializing SIM, thereby reducing the number of unnecessary SIM initialization operations and shortening the SIM initialization time.

According to example various embodiments, when an electronic device selectively uses multiple SIMs, respectively, the electronic device may use SIM data cached when previously initializing SIM of each of the multiple SIMs without repeatedly retrieving data from each of the multiple SIMs for initialization of each of the multiple SIMs every time each of the multiple SIMs is used, thereby reducing the number of unnecessary SIM initialization operations and shortening the SIM initialization time.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

The terms used herein are merely for the purpose of describing various example embodiments and are not intended to limit the scope of the embodiments. A singular expression may include a plural expression unless the context clearly indicates otherwise. All terms used herein, including technical and scientific terms, have the same meaning as those commonly understood by a person skilled in the art to which the disclosure belongs. Such terms commonly used and defined in a dictionary may be interpreted to have the same or similar meaning as the contextual meanings of the related art, and are not to be interpreted to have ideal or excessively formal meanings unless clearly defined herein. In some cases, even the term defined herein should not be interpreted to exclude embodiments of the disclosure.

Figure 1:
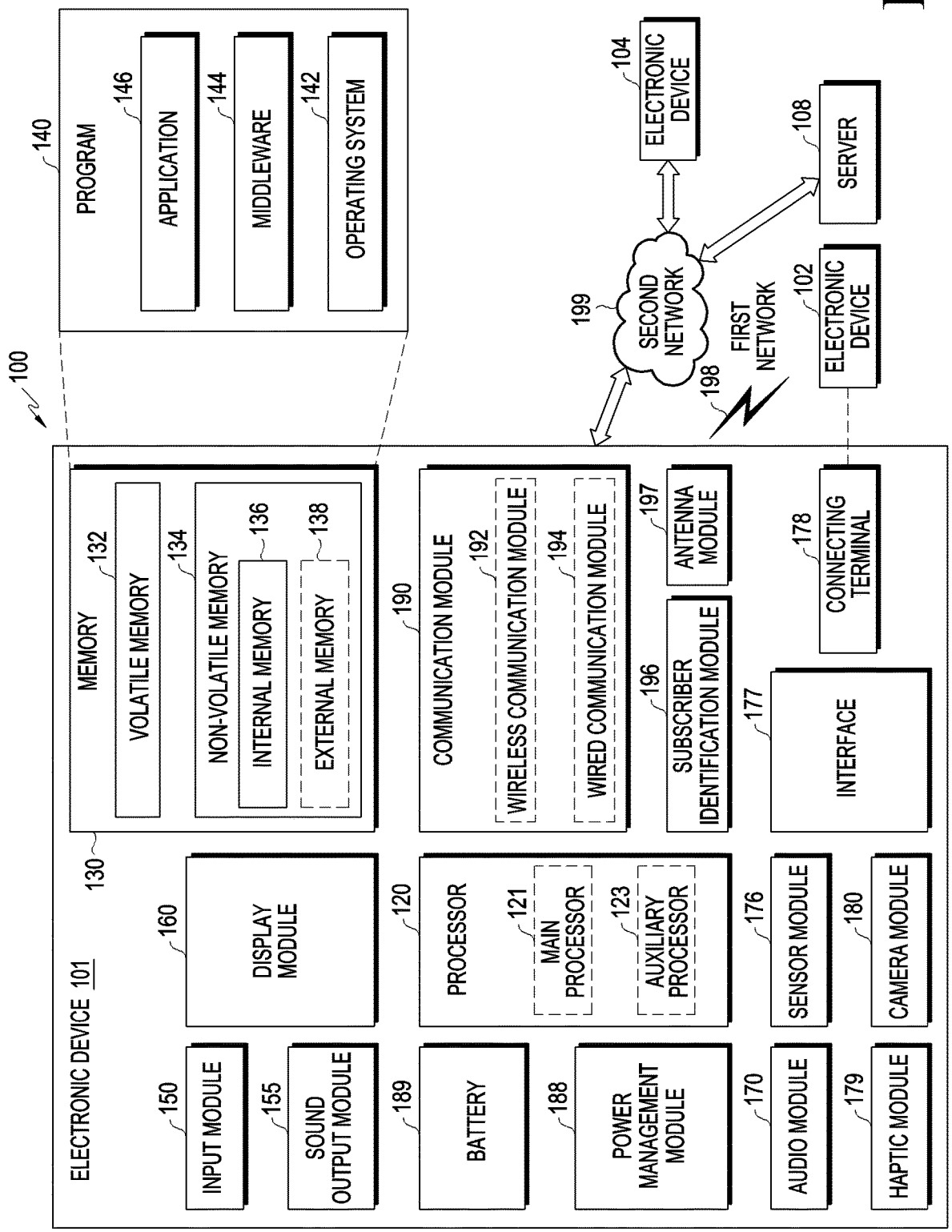
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS)

communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identification (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
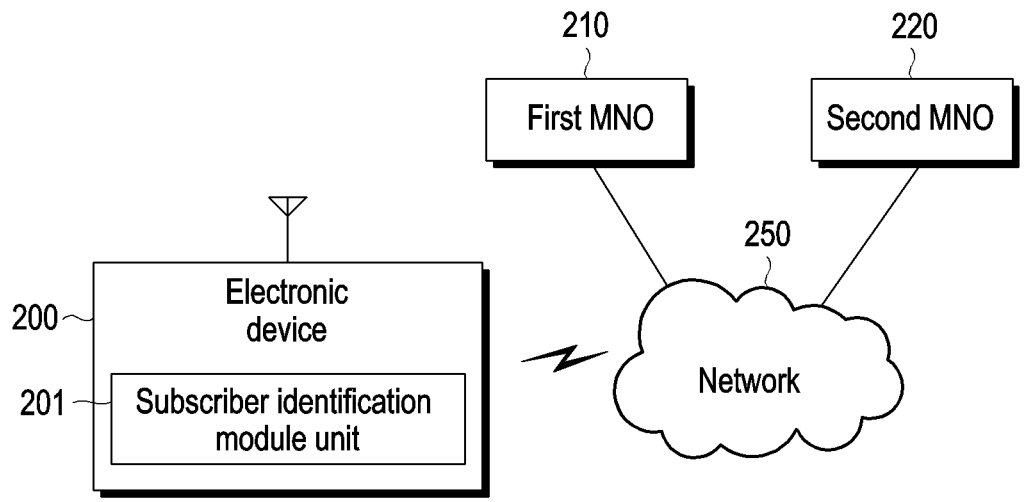
FIG. 2 is a diagram illustrating an electronic device and a communication network operator according to various embodiments.

FIG. 2 is a diagram illustrating an electronic device and a communication network operator according to various embodiments.

Referring to FIG. 2, an electronic device 200 (e.g., the electronic device 101 of FIG. 1) according to an embodiment may include a subscriber identification module unit 201 including at least one subscriber identification module (SIM) (e.g., the subscriber identification module 196 of FIG. 1), and may perform authentication or network registration with a server (e.g., a first MNO 210 or a second MNO 220) of a mobile network operator (MNO) via a network 250 using the at least one subscriber identification module.

According to an embodiment, the at least one subscriber identification module may be in the form of a universal integrated circuit card (UICC). The UICC may be mounted to or embedded in the electronic device 200 and used. Among UICCs, functionally, a UICC in which a profile for use of a communication service can be remotely downloaded and installed may also be referred to as an embedded UICC (eUICC). Physically, the UICC may be various types of chips which are detachably mounted to the electronic device 200 or are embedded in the electronic device 200. For example, the UICC or the eUICC (hereinafter, may be collectively referred to as a UICC) may be equipped with communication applications such as a subscriber identification module (SIM), a universal SIM (USIM), an IP multimedia SIM (ISIM), and a code division multiple access (CDMA) SIM (CSIM), depending on the type of wireless communication network to which a subscriber accesses, or may provide a higher-level security function for mounting various application applications such as an electronic wallet, ticketing, and an electronic passport. In some cases, the UICC may be referred to as a SIM (or a plastic SIM (pSIM)), and the eUICC may be referred to as an embedded SIM (eSIM). In this disclosure, the UICC, eUICC, pSIM, or eSIM may be collectively referred to as a SIM. The SIM may include, as information (e.g., also referred to as "SIM data") for receiving at least one communication service, subscriber identification information (international mobile subscriber identification: IMSI), an integrated circuit card identifier (ICCID), a subscriber's network access authentication information, a subscriber's phone book, a subscriber's personal information (SMS, etc.), or information which enables secure wireless communication use by performing subscriber authentication and traffic security key generation when accessing a wireless communication network such as a global system for mobile communications (GSM), wideband code division multiple access (WCDMA), or long-term evolution (LTE). For example, the subscriber identification information may include a mobile country code (MCC), a mobile network code (MNC), a mobile subscriber identification number, and a national mobile subscription identification number (MSIN).

According to an embodiment, the electronic device 200 may perform authentication with a server of a mobile network operator (MNO) using SIM data of each of at least one SIM. According to an embodiment, the at least one SIM may include a first SIM and a second SIM. The first SIM may include first subscriber identification information (e.g., first SIM data), and the second SIM may include second subscriber identification information (e.g., second SIM data). According to an embodiment, the electronic device 200 may perform authentication for receiving a communication service from the first MNO 210 using the first SIM data of the first SIM. According to an embodiment, the electronic device 200 may perform authentication for receiving a communication service from the second MNO 220 using the second SIM data of the second SIM.

For example, when a user of the electronic device 200 subscribes to a wireless communication service provided by a first communication network operator (the first MNO 210), the electronic device 200 may enable use of the wireless communication service after performing an appropriate authentication process with the first MNO 210 having the same value stored therein using the first SIM data in the first SIM, for example, a first international mobile subscriber identification (IMSI) value and a K value which is an encryption key for authentication. For example, the appropriate authentication process may be authentication and key agreement (AKA) authentication, and other authentication schemes may also be used.

According to an embodiment, each of the at least one SIM may be manufactured as a dedicated card for a corresponding communication network operator at the request of a specific communication network operator, and may be pre-loaded with authentication information (for example, a SIM application and a subscriber identification ID (e.g., an IMSI)) and an encryption key (for example, a known K value or Ki value) for network access of a corresponding communication network operator. An application (or information) in a SIM may be installed, modified, deleted, or updated using a technology such as over the air (OTA) when necessary. According to an embodiment, each of the at least one SIM may download and/or store information for providing a communication service in the form of a profile. According to an embodiment, the profile may be installed or stored in a SIM manufacturing process or downloaded by an electronic device in an over the air (OTA) manner and thus installed or stored in the SIM.

Figure 3:
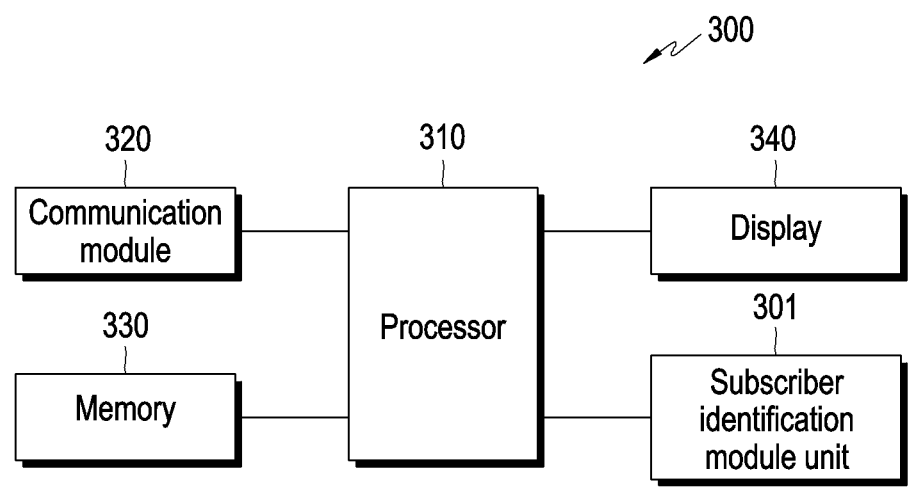
FIG. 3 is a block configuration diagram illustrating an example configuration of an electronic device according to various embodiments.

FIG. 3 is a block diagram illustrating an example configuration of an electronic device according to various embodiments.

Referring to FIG. 3, an electronic device 300 according to an embodiment may include, for example, all or a part of the electronic device 101 shown in FIG. 1 or the electronic device 200 shown in FIG. 2. For example, the electronic device 300 may include a subscriber identification module unit (e.g., including a SIM) 301, a processor (e.g., including processing circuitry) 310, a communication module (e.g., including a communication circuit) 320, a memory 330, and a display 340.

According to an embodiment, the subscriber identification module unit 301 (e.g., the subscriber identification module unit 201 of FIG. 2) may include at least one subscriber identification module (SIM) (e.g., the subscriber identification module 196 of FIG. 1). According to an embodiment, the subscriber identification module unit 301 may include a first subscriber identification module (e.g., a first SIM), include the first SIM and a second subscriber identification module (e.g., a second SIM), or further include one or more additional SIMs in addition to the first SIM and the second SIM. Each of the first SIM and the second SIM may be a plastic subscriber identification module (pSIM) or an embedded subscriber identification module (eSIM).

According to an embodiment, each of the SIMs may include, as information (e.g., also referred to as "SIM data") for receiving a communication service, subscriber identification information (international mobile subscriber identification: IMSI), an integrated circuit card identifier (ICCID), a subscriber's network access authentication information, a subscriber's phone book, a subscriber's personal information (SMS, etc.), or information which enables secure wireless communication use by performing subscriber authentication and traffic security key generation when accessing a wireless communication network such as a global system for mobile communications (GSM), wideband code division multiple access (WCDMA), or long-term evolution (LTE). For example, the subscriber identification information may include a mobile country code (MCC), a mobile network code (MNC), a mobile subscriber identification number, and a national mobile subscription identification number (MSIN). For example, when the subscriber identification module unit 301 includes the first SIM and the second SIM, the subscriber identification module unit 301 may include first SIM data and second SIM data.

According to an embodiment, the processor 310 may include various processing circuitry and perform initialization based on the first SIM or perform initialization based on the second SIM. When the initialization based on the first SIM is performed, the processor 310 may read the first SIM data from the first SIM and cache (or temporarily store) the same in the memory 330, and perform initialization associated with the first SIM using the cached (or temporarily stored) first SIM data. When the initialization based on the second SIM is performed, the processor 310 may read the second SIM data from the second SIM and cache (or temporarily store) the same in the memory 330, and perform initialization associated with the second SIM using the cached (or temporarily stored) second SIM data.

According to an embodiment, the processor 310 may identify whether the first SIM data cached in the memory 330 being valid in association with the first SIM (at the time of previous initialization (e.g., first initialization based on the first SIM)) at the time of the initialization based on the first SIM (e.g., second initialization based on the first SIM), based on the cached first SIM data being valid, perform initialization associated with the first SIM (e.g., the second initialization based on the first SIM) using the cached first SIM data, and based on the cached first SIM data not being valid, perform the SIM initialization (e.g., the first initialization based on the first SIM) using first SIM data from the first SIM. According to an embodiment, the processor 310 may change an input/output path for authentication from the memory 330 to the first SIM while performing the initialization associated with the first SIM using the cached first SIM data, and perform an authentication operation using the first SIM data from the first SIM.

According to an embodiment, the processor 310 may identify whether the second SIM data cached in the memory 330 being valid in association with the second SIM (at the time of previous initialization (e.g., first initialization based on the second SIM)) at the time of the initialization based on the second SIM (e.g., second initialization based on the second SIM), based on the cached second SIM data being valid, perform initialization associated with the second subscriber identification module (e.g., the second initialization based on the second SIM) using the cached second SIM data, and based on the cached second SIM data not being valid, perform the SIM initialization (e.g., the first initialization based on the second SIM) using second SIM data from the second SIM. For example, the first initialization may be an initialization operation using data stored in a SIM (e.g., the first SIM or the second SIM), and the second initialization may be an initialization operation using cached SIM data (e.g., the cached first SIM data or the cached second SIM data). According to an embodiment, the processor 310 may change an input/output path for authentication from the memory 330 to the second SIM while performing the initialization associated with the second SIM using the cached second SIM data, and perform an authentication operation using the second SIM data from the second SIM.

According to an embodiment, the processor 310 may monitor a state of the first SIM, identify whether the cached first SIM data being valid (periodically or whenever an event occurs), based on the state of the first SIM, and store information on whether the cached first SIM data being valid in the memory 330. For example, the processor 310 may configure a flag value indicating whether the cached first SIM data being valid.

According to an embodiment, the processor 310 may monitor a state of the second SIM, identify whether the cached second SIM data being valid (periodically or whenever an event occurs), based on the state of the second SIM, and store information on whether the cached second SIM data being valid in the memory 330. For example, the processor 310 may configure a flag value indicating whether the cached second SIM data being valid. An operation of identifying information on whether cached first SIM data being valid according to a state of each SIM may be described with reference to FIG. 8 to be described later.

According to an embodiment, the communication module 320 (e.g., the communication module 190 of FIG. 1) may include various communication circuitry and support establishment of a direct (e.g., wired) communication channel or a wireless communication channel between the electronic device 300 and an external electronic device (e.g., the electronic device 102, the electronic device 104, and the server 108, or the first MNO 210 and the second MNO 220), and performing communication via the established communication channel. One or more communication processors which support direct (e.g., wired) communication or wireless communication may be included. According to an embodiment, the communication module 320 may include a cellular communication module, a short-range communication module, or a global navigation satellite system (GNSS) communication module or a wired communication module 194 (e.g., a local area network (LAN) communication module or a power line communication module). The communication module 320 may identify and authenticate the electronic device 300 via communication with a communication network operator server such as the first MNO 210 or the second MNO 220 using the first SIM data or the second SIM data stored in the subscriber identification module unit 301.

According to an embodiment, the memory 330 (e.g., the memory 130 of FIG. 1) may store instructions associated with the operation of the processor 310, cache (or temporarily store) first SIM data obtained (or read) from the first SIM when the initialization based on the first SIM is performed in association with the operation of the processor 310, or cache (or temporarily store) second SIM data obtained (or read) from the second SIM when the initialization based on the second SIM is performed.

According to an embodiment, the display 340 may visually provide information to the outside (e.g., a user) of the electronic device 301. For example, the display 340 may visually provide information provided in an initialization operation or an authentication operation using the first SIM or the second SIM.

According to various example embodiments, an electronic device (e.g., the electronic device 101 of FIG. 1, the electronic device 200 of FIG. 2, or the electronic device 300 of FIG. 3) may include a communication circuit (e.g., the communication module 190 of FIG. 1 or the communication module 320 of FIG. 3), a first subscriber identification module (SIM) comprising subscriber identification circuitry (e.g., the subscriber identification module 196 of FIG. 1) including information for providing a first communication service, a memory (e.g., the memory 130 of FIG. 1 or the memory 330 of FIG. 3), and at least one processor (e.g., the processor 120 of FIG. 1 or the processor 310 of FIG. 3) operatively connected to the communication circuit, the first SIM, and the memory, wherein the memory stores instructions which when executed, cause the at least one processor to identify whether first SIM data cached in the memory being valid in association with the information for providing the first communication service of the first SIM when initializing based on the first SIM, based on the cached first SIM data being valid, perform initialization associated with the first SIM using the cached first SIM data, and based on the cached first SIM data not being valid, perform the initialization associated with the first SIM using first SIM data associated with the information for providing the first communication service from the first SIM.

According to an example embodiment, the instructions, when executed, may cause the at least one processor to further perform an operation of monitoring a state associated with the information for providing the first communication service of the first SIM, and storing, in the memory, information on whether the cached first SIM data being valid, based on the state associated with the information for providing the first communication service of the first SIM.

According to an example embodiment, the information for providing the first communication service may include a profile, and the state associated with the information for providing the first communication service of the first SIM may include at least one of a state in which the profile does not exist, a state in which the profile is downloaded, a state in which the profile is deleted, a state in which the profile is activated, a state in which the profile is deactivated, or a state in which the first SIM is removed.

According to an example embodiment, the instructions may be configured to cause the at least one processor to change an input/output path for authentication from the memory to the first SIM while performing the initialization associated with the first SIM using the cached first SIM data, and perform an authentication operation using the first SIM data from the first SIM.

According to an example embodiment, the instructions, when executed, may cause the at least one processor to change the input/output path from the first SIM to the memory based on performing the authentication operation.

According to an example embodiment, the electronic device may further include a second SIM including information for providing a second communication service, and the instructions, when executed, may cause the at least one processor to identify whether cached second SIM data being valid in association with the information for providing the second communication service of the second SIM when initializing based on the second SIM, based on the cached second SIM data being valid, perform initialization associated with the second SIM using the cached second SIM data, and based on the cached second SIM data not being valid, perform the initialization associated with the second SIM using second SIM data associated with the information for providing the second communication service from the second SIM.

According to an example embodiment, the instructions, when executed, may cause the at least one processor to change an input/output path for authentication from the memory to the second SIM while performing the initialization associated with the second SIM using the cached second SIM data, and perform an authentication operation using the second SIM data from the second SIM.

According to an example embodiment, the electronic device may further include a SIM driver, and the instructions, when executed, may cause the at least one processor to control the SIM driver to activate (or enable or drive) one of the first SIM and the second SIM.

According to an example embodiment, each of the first SIM and the second SIM may be a plastic SIM (pSIM) or an embedded SIM (eSIM).

Figure 4A:
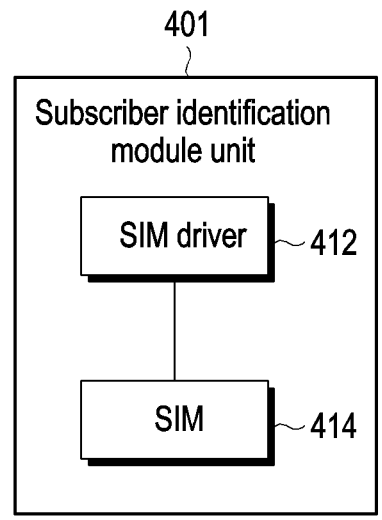
FIGS. 4A and 4B are block diagrams illustrating example configurations of a subscriber identification module unit according to various embodiments.
Figure 4B:
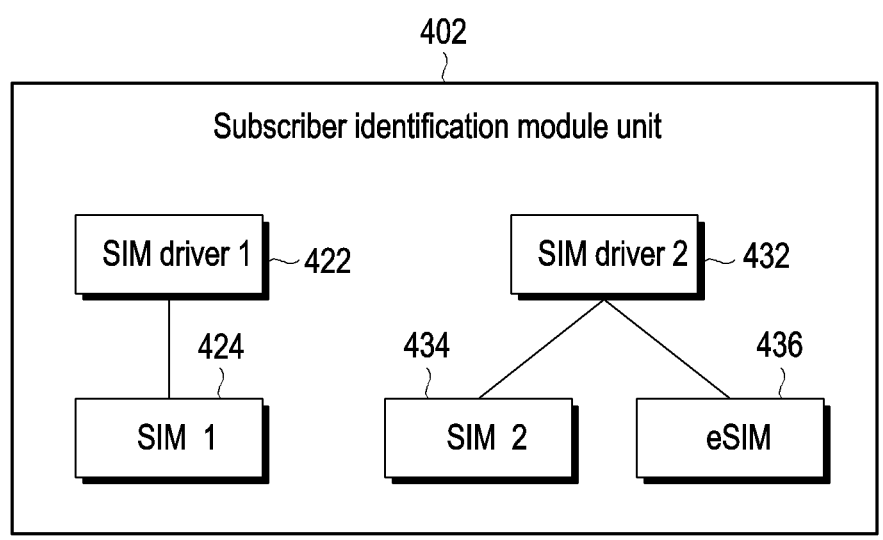

FIGS. 4A and 4B are diagrams illustrating example configurations of a subscriber identification module unit according to various embodiments.

FIG. 4A is a diagram illustrating an example in which a subscriber identification module unit 401 (e.g., the subscriber identification module unit 201 of FIG. 2 or the subscriber identification module unit 301 of FIG. 3) according to an embodiment has one subscriber identification module. Referring to FIG. 4A, the subscriber identification module unit 401 according to an embodiment may include one SIM driver (SIM driver) 412 and one subscriber identification module (SIM) 414. The SIM driver 412 may drive or activate the SIM 414.

FIG. 4B is a diagram illustrating a case in which a subscriber identification module unit 402 (e.g., the subscriber identification module unit 201 of FIG. 2 or the subscriber identification module unit 301 of FIG. 3) according to an embodiment has multiple subscriber identification modules. Referring to FIG. 4B, the subscriber identification module unit 402 according to an embodiment may include a first SIM driver (SIM driver1) 422, a first subscriber identification module (SIM1) 424, a second SIM driver (SIM driver2) 432, a second subscriber identification module (SIM2) 434, and another subscriber identification module (eSIM) 436. The SIM driver1 422 may drive or activate the SIM1 424. The SIM driver2 432 may drive or activate the SIM2 434 or the eSIM 436. The subscriber identification module unit 402 may further include a separate switching circuit (not shown), and use the switching circuit to selectively drive or activate one of the SIM2 434 and the eSIM 436. For example, the SIM2 434 may be a plastic SIM, and the eSIM 436 may be an embedded SIM.

According to an embodiment, when the electronic device 300 includes the subscriber identification module unit 402 as shown in FIG. 4B, the electronic device 300 may selectively access the SIM2 434 or the eSIM 436. According to an embodiment, the SIM2 434 and the eSIM 436 may share one switch (or a switch circuit) in order for communication with the electronic device 300 (e.g., the processor 310 of the electronic device 300), and when one of the SIM2 434 and the eSIM 436 occupies the switch, the other slot may not be able to occupy the switch. For example, the switch may play a role as a power supply to the SIM2 434 or the eSIM 436, an input/output (I/O) line, a clock supply, and the like, and when one of the SIM2 434 and the eSIM 436 is in a state of being connected to the switch (e.g., an active state), the other may be in a state of being disconnected from the switch (e.g., a deactivated state). In a deactivated state, the SIM2 434 or the eSIM 436 may not be able to communicate with the electronic device 300 (e.g., the processor 310 of the electronic device 300) or communicate with a network.

For example, if the switch is assigned to the eSIM 436, the electronic device 300 (e.g., the processor 310 of the electronic device 300) is disconnected from the SIM2 434, and may not be able to read SIM data of the SIM2 434 and may not be able to perform network registration using the SIM2 434. In a state where the switch is assigned to the eSIM 436 and registered on the network using the eSIM 436, if the switch is assigned to the SIM2 434 in order to access the SIM2 434, conversely, the eSIM 436 may be in a network unregistered state. When the electronic device 300 accesses the SIM2 434, accesses the eSIM 436, and attempts to access the SIM2 434 again, the electronic device 300 is required to respectively initialize the SIM2 434 or the eSIM 436 whenever the electronic device 300 accesses the SIM2 434 or the eSIM 436, and is required to repeatedly and frequently perform an operation of caching SIM data of the SIM2 434 and an operation of caching SIM data of the eSIM 436 according to each initialization, and thus a processing time may take longer and data throughput may increase.

According to an embodiment, the electronic device 300 is required to respectively initialize the SIM2 434 or the eSIM 436 when booting, when the SIM2 434 or eSIM 436 is detached/attached, or when entering a SIM card manager menu, and is required to repeatedly and frequently perform an operation of caching SIM data of the SIM2 434 and an operation of caching SIM data of the eSIM 436 according to each initialization, and thus a processing time may take longer and data throughput may increase. For example, when the electronic device 300 displays information of the SIM2 434 and the eSIM 436 via the SIM card manager menu, the electronic device 300 may be required to access each of the SIM2 434 and the eSIM 436, when the electronic device 300 accesses each of the SIM2 434 and the eSIM 436, the electronic device 300 is required to sequentially initialize the SIM2 434 and the eSIM 436 alternately, and is required to repeatedly and frequently perform an operation of caching SIM data of the SIM2 434 and an operation of caching SIM data of the eSIM 436 according to each initialization, and thus a processing time may take longer and data throughput may increase. According to an embodiment, when an electronic device (e.g., the electronic device 101 of FIG. 1, the electronic device 200 of FIG. 2, or the electronic device 300 of FIG. 3) selectively uses each of a plurality of SIMs (e.g., the SIM2 434 and the eSIM 436), whenever the electronic device 300 uses each of the plurality of SIMs, the electronic device 300 may use SIM data cached at previous SIM initialization of each of the plurality of SIMs without repeatedly requesting data and receiving a response from the plurality of SIMs.

Figure 5:
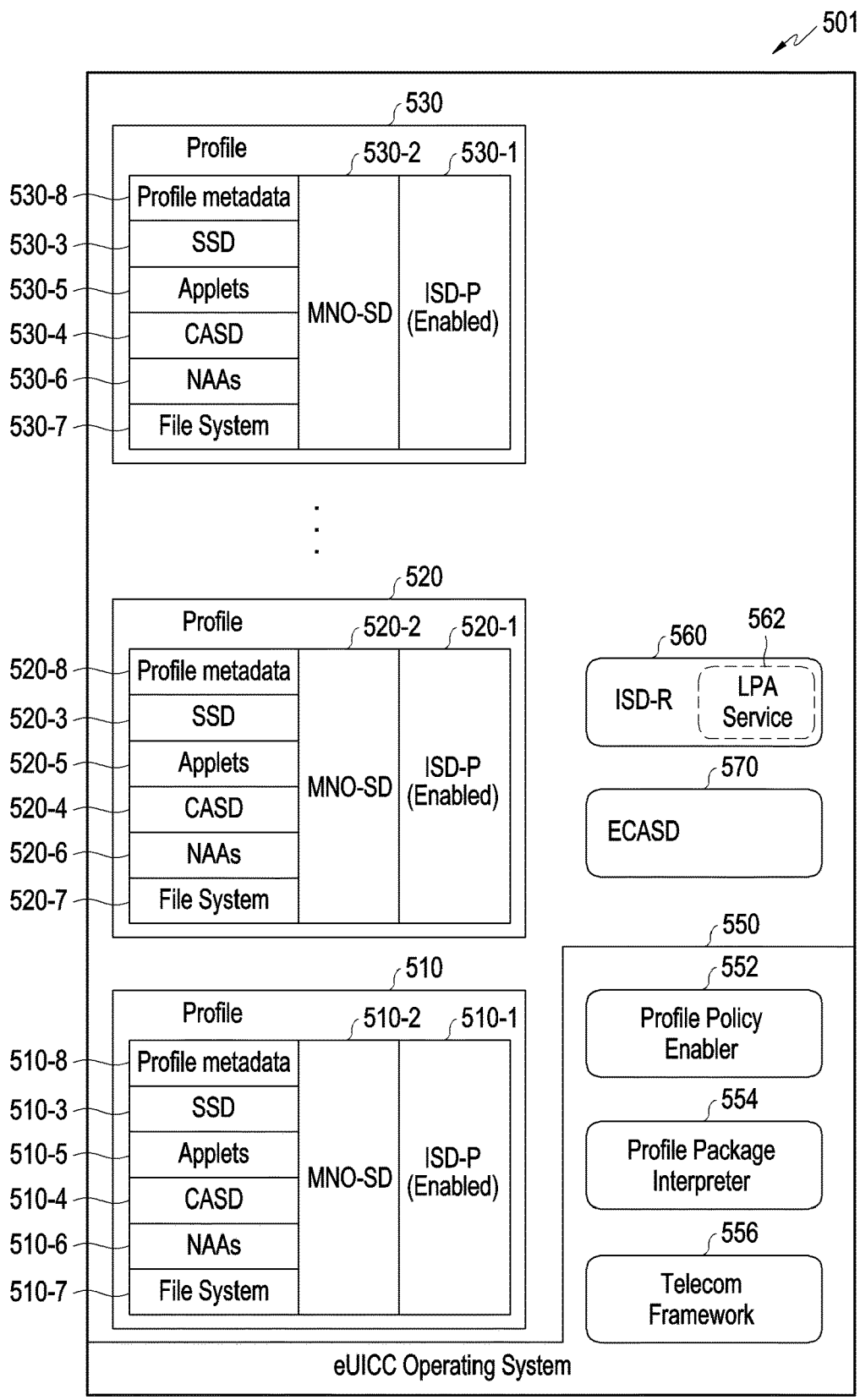
FIG. 5 is a diagram illustrating an example internal structure of a SIM according to various embodiments.

FIG. 5 is a diagram illustrating an example internal structure of a SIM according to various embodiments.

Referring to FIG. 5, a SIM according to an embodiment may be in the form of a card or a chip such as an eUICC 501, and may include at least one profile 510, 520, and 530 in a software format as SIM data. According to various embodiments, each of the at least one profile 510, 520, and 530 may operate on an eUICC operating system (OS) 550. Each of the at least one profile 510, 520, and 530 may become in a state of being enabled or disabled by a processor (e.g., the processor 120 of FIG. 1 or the processor 310 of FIG. 3) of an electronic device (e.g., the electronic device 101 of FIG. 1, the electronic device 200 of FIG. 2, or the electronic device 300 of FIG. 3). FIG. 5 illustrates a case in which one profile 510 is in an enabled state and the other profiles 520 and 530 are in a disabled state according to an embodiment.

According to various embodiments, the eUICC operating system (OS) 550 of the eUICC 501 may include a profile policy enabler 552, a profile package interpreter 554, and a telecom framework 556. According to an embodiment, the profile policy enabler 552 may manage a policy rule for each of the at least one profile 510, 520, and 530. According to an embodiment, the profile package interpreter 554 may unpackage a profile package received from an SM-DP+ 220 in a form which may be installed in the eUICC 501. According to an embodiment, the telecom framework 556 may perform a function related to communication of applications in the eUICC 501. According to various embodiments, the eUICC 501 may include an issuer security domain root (ISD-R) 560 and an ECASD 570. According to an embodiment, the ISD-R 560 may manage the at least one profile 510, 520, and 530 installed in the eUICC 501. For example, the ISD-R 560 may include an LPA service 562, and the LPA service 562 may manage the at least one profile 510, 520, and 530 installed in the eUICC 501 via an interface with the processor (e.g., the processor 120 of FIG. 1 or the processor 310 of FIG. 3). According to an embodiment, the Euicc controlling authority security domain (EC-ASD) 570 may perform security processing of the at least one profile 510, 520, and 530 installed in the eUICC 501.

According to an embodiment, each of the at least one profile 510, 520, and 530 may include ISD-P 510-1, 520-1, or 530-1, MNO-SD 510-2, 520-2, or 530-2, a supplementary security domain (SSD) 510-3, 520-3, or 530-3, a controlling authority security domain (CASD) 510-4, 520-4, or 530-4, applets 510-5, 520-5, or 530-5, network access applications (NAAs) 510-6, 520-6, or 530-6, a file system 510-7, 520-7, or 530-7, or profile metadata 510-8, 520-8, or 530-8.

According to an embodiment, the ISD-P 510-1, 520-1, or 530-1 may include information for decoding and interpretation of a profile package, and may be used to unpackage and install a profile package received from the DHK SM-DP+ 220 in cooperation with the profile package interpreter 554.

According to an embodiment, the MNO-SD 510-2, 520-2, or 530-2 may include an over the air (OTA) key of MNO, and may include information for providing a secure OTA channel capable of communicating with the MNO.

According to an embodiment, the supplementary security domain (SSD) 510-3, 520-3, or 530-3 and the controlling authority security domain (CASD) 510-4, 520-4, or 530-4 may include information for performing security processing of a profile.

According to an embodiment, the applets 510-5, 520-5, or 530-5 may include various pieces of application information associated with a user of the profile.

According to an embodiment, the network access applications (NAAs) 510-6, 520-6, or 530-6 may include application information which allows the profile to access a network.

According to an embodiment, the file system 510-7, 520-7, or 530-7 may include a file system associated with each piece of information of the profile.

According to an embodiment, the profile metadata 510-8, 520-8, or 530-8 may also be referred to as a profile record, and may include metadata information on the profile in a text form. The metadata information may include an integrated circuit card ID (ICCID) of a profile, a profile name, a name of a profile providing MNO, a user's profile nickname, an icon, a profile class, notification configuration information, profile owner information, or a profile policy rule.

According to an embodiment, the ICCID of the profile may indicate a unique identifier of each profile as a profile identifier. The profile name may include a name of each profile. The name of the profile providing MNO may include a name of a communication network operator having provided the profile. The user's profile nickname may include a profile nickname specified by the user. The icon may include an icon corresponding to a profile. The profile class may include information indicating the type of profile. The notification configuration information may include an address of a server to be notified, and the like. The profile owner information may include mobile country code (MCC), mobile network code (MNC), and group identifier (GID) 1 or 2 information associated with a profile owner. For example, the mobile country code (MCC) may be a code for identifying a country, and the mobile network code (MNC) may be a code for identifying a mobile communication operator. The group identifier (GID) 1 or 2 may be code area information for identifying a group or area to which a profile belongs. The area information may include a group including a plurality of countries. The profile policy rule may include policy rule information for managing a profile.

According to an embodiment, the processor (e.g., the processor 120 of FIG. 1 or the processor 310 of FIG. 3) of the electronic device (e.g., the electronic device 101 of FIG. 1, the electronic device 200 of FIG. 2, or the electronic device 300 of FIG. 3) may perform SIM initialization using one of the profiles 510, 520, and 530 in the eUICC 501.

Figure 6:
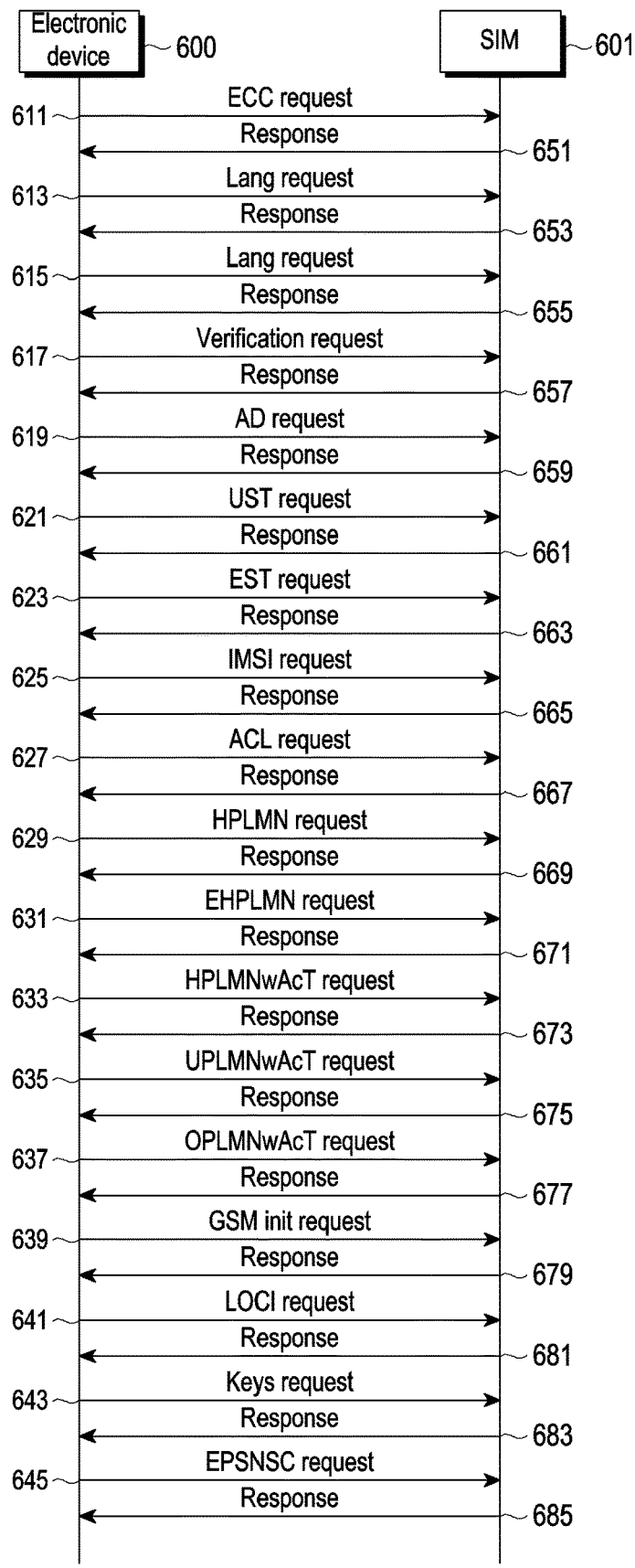
FIG. 6 is a signal flow diagram illustrating an example initialization operation between an electronic device and a SIM according to various embodiments.

FIG. 6 is a signal flow diagram illustrating an example initialization operation between an electronic device and a SIM according to various embodiments.

Referring to FIG. 6, an electronic device 600 (e.g., the electronic device 101 of FIG. 1, the electronic device 200 of FIG. 2, or the electronic device 300 of FIG. 3) according to an embodiment may perform an initialization operation with a SIM 601 (e.g., the subscriber identification module 196 of FIG. 1, the SIM of the subscriber identification module unit 201 of FIG. 2, the SIM of the subscriber identification module unit 301 of FIG. 3, the SIM 414 of FIG. 4A, or the SIM1 424, the SIM2 434, or the eSIM 436 of FIG. 4B). The electronic device 600 according to an embodiment may allow access of various data fields of SIM data included in the SIM 601 to the SIM 60 through the initialization operation, and may start a communication session (for example, a 2G, 3G, 4G, or 5G communication session) by registering with a communication network via the initialization operation. According to an embodiment, the initialization operation may be started based on various initialization operation start events, such as when the electronic device 600 is powered on and then booted, when the SIM 601 is detached or attached, or when a SIM card manager menu is entered.

The electronic device 600 according to an embodiment may perform a part or all of operations 611 to 645 at the time of initialization with the SIM 601, and the SIM 601 may perform a part or all of operations 651 to 685 based on a request from the electronic device 600 at the time of initialization with the electronic device 600.

In operation 611, the electronic device 600 according to an embodiment may request emergency call codes (ECC) from the SIM 601, and in operation 651, the SIM 601 may respond to the ECC. For example, the emergency call codes (ECC) may include information for an emergency call.

In operation 613, the electronic device 600 according to an embodiment may request a language indication, and in operation 653, the SIM 601 may respond to the language indication.

In operation 615, the electronic device 600 according to an embodiment may request a language preference, and in operation 655, the SIM 601 may respond to the language preference.

In operation 617, the electronic device 600 according to an embodiment may request verification, and in operation 657, the SIM 601 may respond to the verification.

In operation 619, the electronic device 600 according to an embodiment may request administrative data, and in operation 659, the SIM 601 may respond to the administrative data. For example, the administrative data may include data associated with MCC and MNC information structures and an operation mode of the electronic device.

In operation 621, the electronic device 600 according to an embodiment may request a USIM service table, and in operation 661, the SIM 601 may respond to the USIM service table. For example, the USIM service table may include capability information of a USIM.

In operation 623, the electronic device 600 according to an embodiment may request an enabled services table, and in operation 663, the SIM 601 may respond to the enabled services table.

In operation 625, the electronic device 600 according to an embodiment may request an IMSI, and in operation 665, the SIM 601 may respond to the IMSI.

In operation 627, the electronic device 600 according to an embodiment may request access control information, and in operation 667, the SIM 601 may respond to the access control information. For example, the access control information may include an access control list.

In operation 629, the electronic device 600 according to an embodiment may request a higher priority PLMN search period (HPPLMN), and in operation 669, the SIM 601 may respond to the HPLMN search period.

In operation 631, the electronic device 600 according to an embodiment may request an equivalent home public land mobile network (EHPLMN) search period, and in operation 671, the SIM 601 may respond to the EHPLMN search period.

In operation 633, the electronic device 600 according to an embodiment may request HPLMN selector with access technology (HPLMNwAct), and in operation 673, the SIM 601 may respond to the HPLMwAct.

In operation 635, the electronic device 600 according to an embodiment may request user controlled PLMN selector with access technology (UPLMNwAct), and in operation 675, the SIM 601 may respond to the UPLMNwAct.

In operation 637, the electronic device 600 according to an embodiment may request an operator controlled PLMN selector with access technology (OPLMNwAct), and in operation 677, the SIM 601 may respond to the OPLMNwAct.

In operation 639, the electronic device 600 according to an embodiment may request global system for mobile communications (GSM) initialization, and in operation 679, the SIM 601 may respond to the GSM initialization.

In operation 641, the electronic device 600 according to an embodiment may request location information, and in operation 681, the SIM 601 may respond to the location information.

In operation 643, the electronic device 600 according to an embodiment may request keys (e.g., a Cipher key and an integrity key), and in operation 683, the SIM 601 may respond to the keys.

In operation 645, the electronic device 600 according to an embodiment may request an evolved packet systems (EPS) non access stratum (NAS) security context, and in operation 685, the SIM 601 may respond to the EPS NAS security context.

According to an embodiment, an electronic device (e.g., the electronic device 101 of FIG. 1, the electronic device 200 of FIG. 2, the electronic device 300 of FIG. 3, or the electronic device 600 of FIG. 6) may access each information of a SIM (e.g., the subscriber identification module 196 of FIG. 1, the SIM of the subscriber identification unit 201 of FIG. 2, the SIM of the subscriber identification module unit 301 of FIG. 3, the SIM 414 of FIG. 4A, the SIM1 424, the SIM2 434, or the eSIM 436 of FIG. 4B, or the SIM 601 of FIG. 6) using a transfer protocol data unit (TPDU) interface scheme, and a protocol (e.g., a protocol defined in ISO 7816) used for the access is based on a serial communication scheme, so that an access speed may be slow. Accordingly, since the electronic device (e.g., the electronic device 101 of FIG. 1, the electronic device 200 of FIG. 2, the electronic device 300 of FIG. 3, or the electronic device 600 of FIG. 6) requires a large number of requests and responses in a SIM initialization operation (for example, the SIM initialization operation of FIG. 6), the SIM initialization operation may take a long time of about tens of seconds (e.g., about 20 to 30 seconds).

According to an embodiment, in the SIM initialization operation, the electronic device (e.g., the electronic device 101 of FIG. 1, the electronic device 200 of FIG. 2, the electronic device 300 of FIG. 3, or the electronic device 600 of FIG. 6) may reuse SIM data (for example, various pieces of data received from the SIM 601 in FIG. 6) cached in a memory, based on whether the SIM data being valid, so that a SIM initialization time can be reduced or SIM initialization can be omitted.

Figure 7:
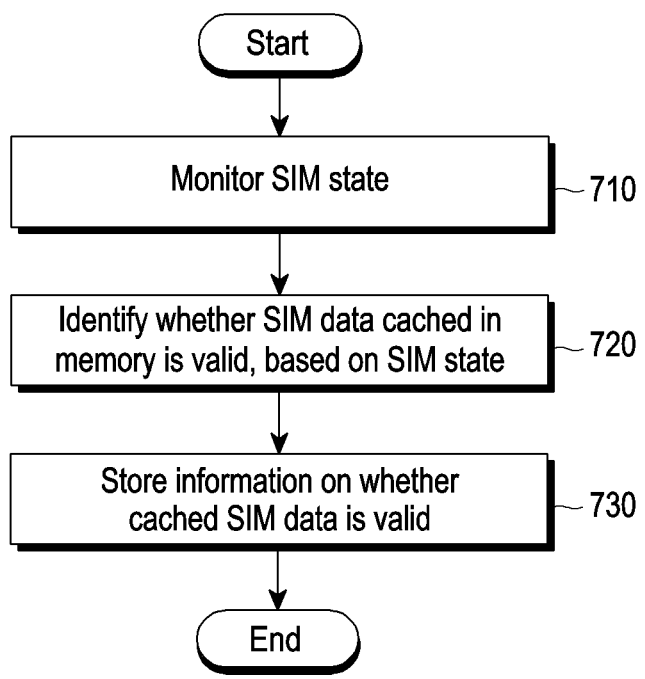
FIG. 7 is a flowchart illustrating an example operation of storing information on whether cached SIM data being valid in an electronic device according to various embodiments.

FIG. 7 is a flowchart illustrating an example operation of storing information on whether cached SIM data being valid in an electronic device according to various embodiments.

Referring to FIG. 7, a processor (e.g., the processor 120 of FIG. 1 or the processor 310 of FIG. 3) (hereinafter, the processor 310 will be described as an example) of an electronic device (e.g., the electronic device 101 of FIG. 1, the electronic device 200 of FIG. 2, the electronic device 300 of FIG. 3, or the electronic device 600 of FIG. 6) according to an embodiment may perform a part or all of operations 710 to 730.

In operation 710, the processor 310 according to an embodiment may monitor a state of a SIM (e.g., the SIM1 414 of FIG. 4A, or the SIM2 434 or the eSIM 436 of FIG. 4B). For example, the state of the SIM may be at least one state among profile download, profile deletion (delete profile), activate, deactivate, data update, and SIM deletion (delete).

In operation 720, the processor 310 according to an embodiment may identify whether SIM data cached in a memory (e.g., the memory 130 of FIG. 1 or the memory 330 of FIG. 3) being valid (validity), based on the state of the SIM. For example, the SIM data may be SIM data read from the SIM and cached in the memory in an SIM initialization operation, and may further include SIM initialization data obtained using the SIM data.

In operation 730, the processor 310 according to an embodiment may store information on whether the cached SIM data being valid. For example, the processor 310 may configure a SIM data validity flag value, based on whether the cached SIM data being valid.

Figure 8:
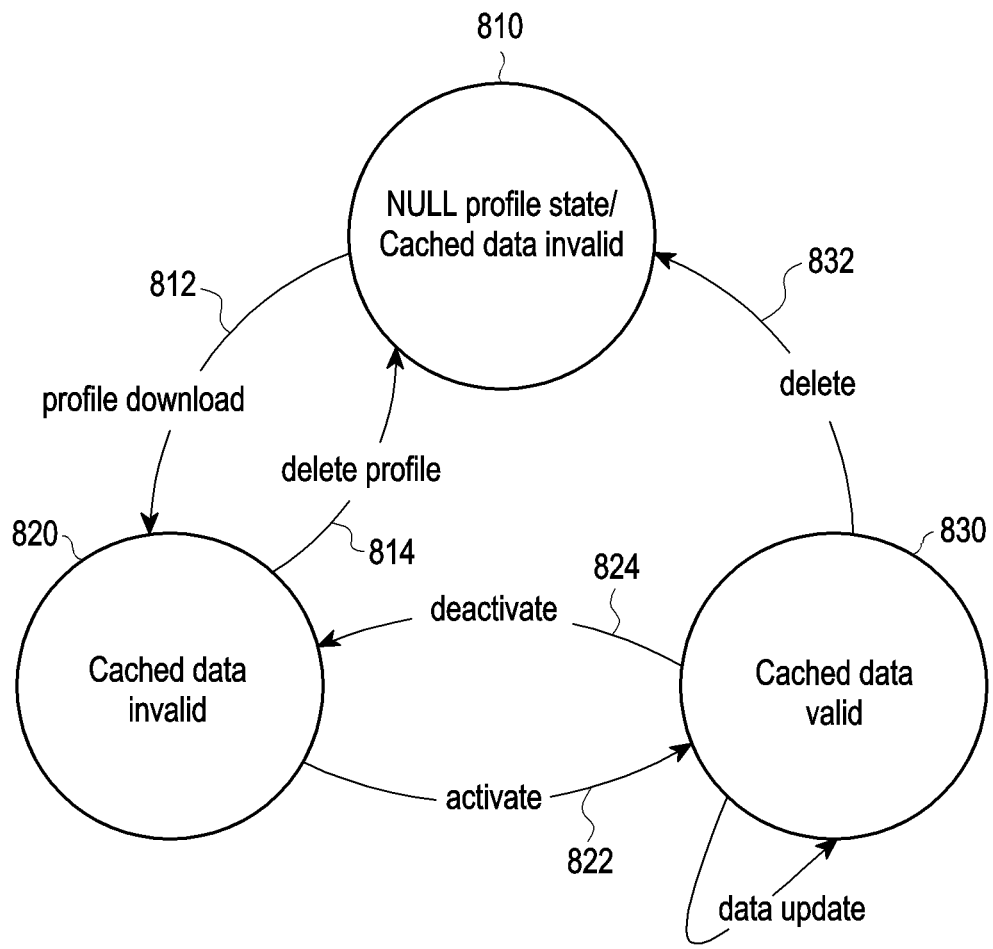
FIG. 8 is a state diagram illustrating an example operation of configuring whether cached SIM data being valid based on a SIM state by an electronic device according to various embodiments.

FIG. 8 is a state diagram illustrating an example operation of configuring whether cached SIM data being valid based on a SIM state by an electronic device according to various embodiments.

Referring to FIG. 8, when a profile does not exist as in a null profile state 810, a processor (e.g., the processor 120 of FIG. 1 or the processor 310 of FIG. 3) (hereinafter, the processor 310 will be described as an example) of an electronic device (e.g., the electronic device 101 of FIG. 1, the electronic device 200 of FIG. 2, the electronic device 300 of FIG. 3, or the electronic device 600 of FIG. 6) according to an embodiment may configure (or identify or store), as cached data invalid, information on whether cached SIM data being valid.

When the processor 310 according to an embodiment becomes in a profile download 812 state from the null profile state 810 or is in a delete profile 814 state, the processor 310 may configure, as cached data invalid 820, the information on whether the cached SIM data being valid. For example, the null profile state 810 may be a state in which the profile does not exist. The profile download 812 state may be a state in which the profile has been downloaded but not activated. The delete profile 814 state may be a state in which the profile is deleted.

When the processor 310 according to an embodiment becomes in an activate 822 state from the profile download 812 state, the processor 310 may configure, as cached data valid 830, the information on whether the cached SIM data being valid. The activate 822 state may be a state in which the profile is active (or activated).

When the processor 310 according to an embodiment becomes in a deactivate 824 state from the profile download 812 state, the processor 310 may configure, as the cached data invalid 820, the information on whether the cached SIM data being valid. The deactivate 824 state may be a state in which the profile is deactivated (or not activated).

When the processor 310 according to an embodiment becomes in a SIM delete 832 state, the processor 310 may configure, as the cached data invalid 810, the information on whether the cached SIM data being valid. The SIM delete 832 state may be a state in which the SIM is removed and thus the profile does not exist.

According to an example embodiment, a method for using cached data based on subscriber identification information in an electronic device (e.g., the electronic device 101 of FIG. 1, the electronic device 200 of FIG. 2, the electronic device 300 of FIG. 3, or the electronic device 600 of FIG. 6) may include identifying whether first subscriber identification module (SIM) data cached in a memory (e.g., the memory 130 of FIG. 1 or the memory 330 of FIG. 3) being valid in association with information for providing a first communication service of a first SIM (e.g., the subscriber identification module 196 of FIG. 1, the subscriber identification module included in the subscriber identification module unit 201 of FIG. 2, the subscriber identification module included in the subscriber identification module unit 301 of FIG. 3, the SIM 414 of FIG. 4A, or the SIM1 424, the SIM2 434, or the eSIM 436 of FIG. 4B) when initializing based on the first SIM, based on the cached first SIM data being valid, performing initialization associated with the first SIM using the cached first SIM data, and based on the cached first SIM data not being valid, performing the initialization associated with the first SIM using first SIM data associated with the information for providing the first communication service from the first SIM.

According to an example embodiment, the method may further include monitoring a state associated with the information for providing the first communication service of the first SIM, and storing, in the memory, information on whether the cached first SIM data being valid, based on a state of the first SIM.

According to an example embodiment, the information for providing the first communication service may include a profile, and the state associated with the information for providing the first communication service of the first SIM may include at least one of a state in which the profile does not exist, a state in which the profile is downloaded, a state in which the profile is deleted, a state in which the profile is activated, a state in which the profile is deactivated, or a state in which the first SIM is removed.

According to an example embodiment, the method may further include changing an input/output path for authentication from the memory to the first SIM while performing the initialization associated with the first SIM using the cached first SIM data, and performing an authentication operation using the first SIM data from the first SIM.

According to an example embodiment, the method may further include changing the input/output path from the first SIM to the memory after performing the authentication operation.

According to an example embodiment, the method may further include identifying whether cached second SIM data being valid in association with information for providing a second communication service of a second SIM when initializing based on the second SIM, based on the cached second SIM data being valid, performing initialization associated with the second SIM using the cached second SIM data, and based on the cached second SIM data not being valid, performing the initialization associated with the second SIM using second SIM data associated with the information for providing the second communication service from the second SIM.

According to an example embodiment, the method may further include changing an input/output path for authentication from the memory to the second SIM while performing the initialization associated with the second SIM using the cached second SIM data, and performing an authentication operation using the second SIM data from the second SIM.

According to an example embodiment, the method may further include controlling a SIM driver to activate one of the first SIM and the second SIM.

According to an example embodiment, each of the first SIM and the second SIM may be a plastic SIM (pSIM) or an embedded SIM (eSIM).

Figure 9:
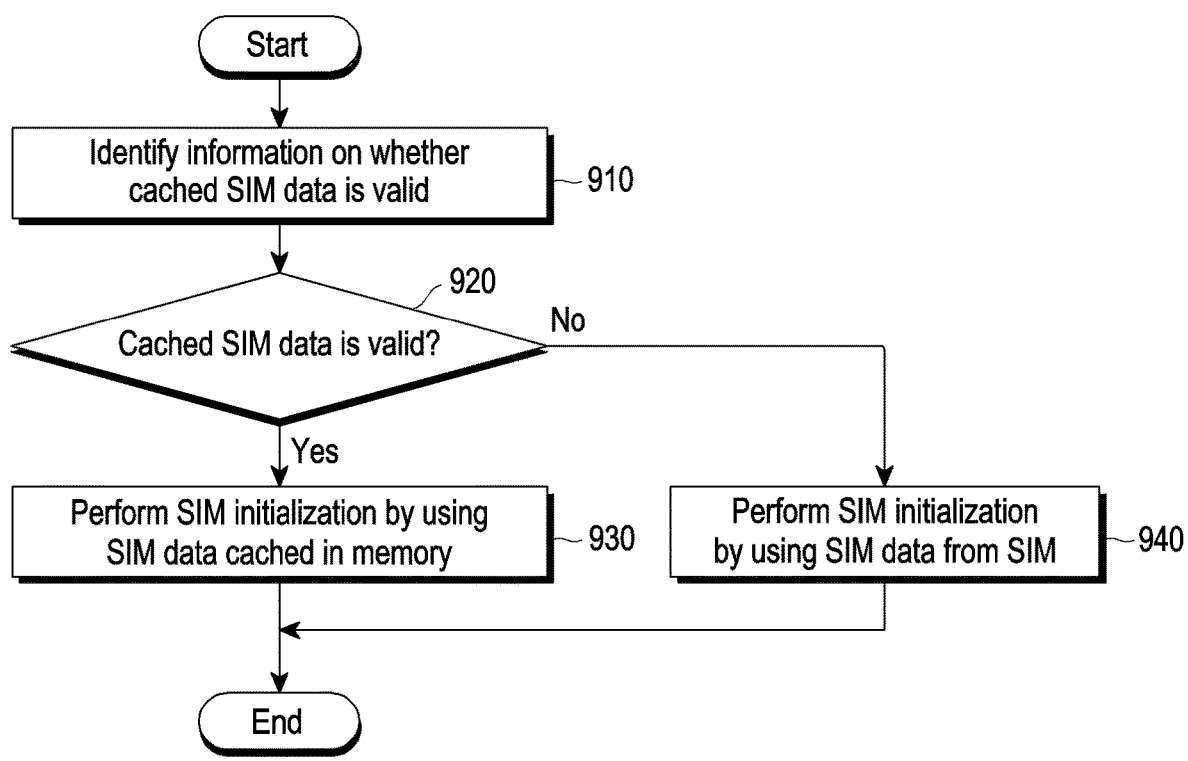
FIG. 9 is a flowchart illustrating an example SIM initialization operation based on whether cached SIM data being valid in an electronic device according to various embodiments.

FIG. 9 is a flowchart illustrating an example SIM initialization operation based on whether cached SIM data being valid in an electronic device according to various embodiments.

Referring to FIG. 9, a processor (e.g., the processor 120 of FIG. 1 or the processor 310 of FIG. 3) (hereinafter, the processor 310 will be described as an example) of an electronic device (e.g., the electronic device 101 of FIG. 1, the electronic device 200 of FIG. 2, the electronic device 300 of FIG. 3, or the electronic device 600 of FIG. 6) according to an embodiment may perform a part or all of operations 910 to 940.

In operation 910, the processor 310 according to an embodiment may obtain information on whether SIM data cached in a memory (e.g., the memory 130 of FIG. 1 or the memory 330 of FIG. 3) being valid. For example, the processor 310 may obtain a cached SIM data validity flag value.

In operation 920, the processor 310 according to an embodiment may identify whether the cached SIM data being valid, based on validity information on the cached SIM data. For example, the processor 310 may identify whether the cached SIM data being valid, based on the validity flag value of the cached SIM data.

In operation 930, based on the cached SIM data being valid, the processor 310 according to an embodiment may perform SIM initialization (e.g., a part or all of the SIM initialization operations of FIG. 6) using the SIM data cached in the memory 330.

In operation 940, based on the cached SIM data not being valid, the processor 310 according to an embodiment may (directly) access a SIM, read SIM data, and perform SIM initialization (e.g., a part or all of the SIM initialization operations of FIG. 6).

Figure 10:
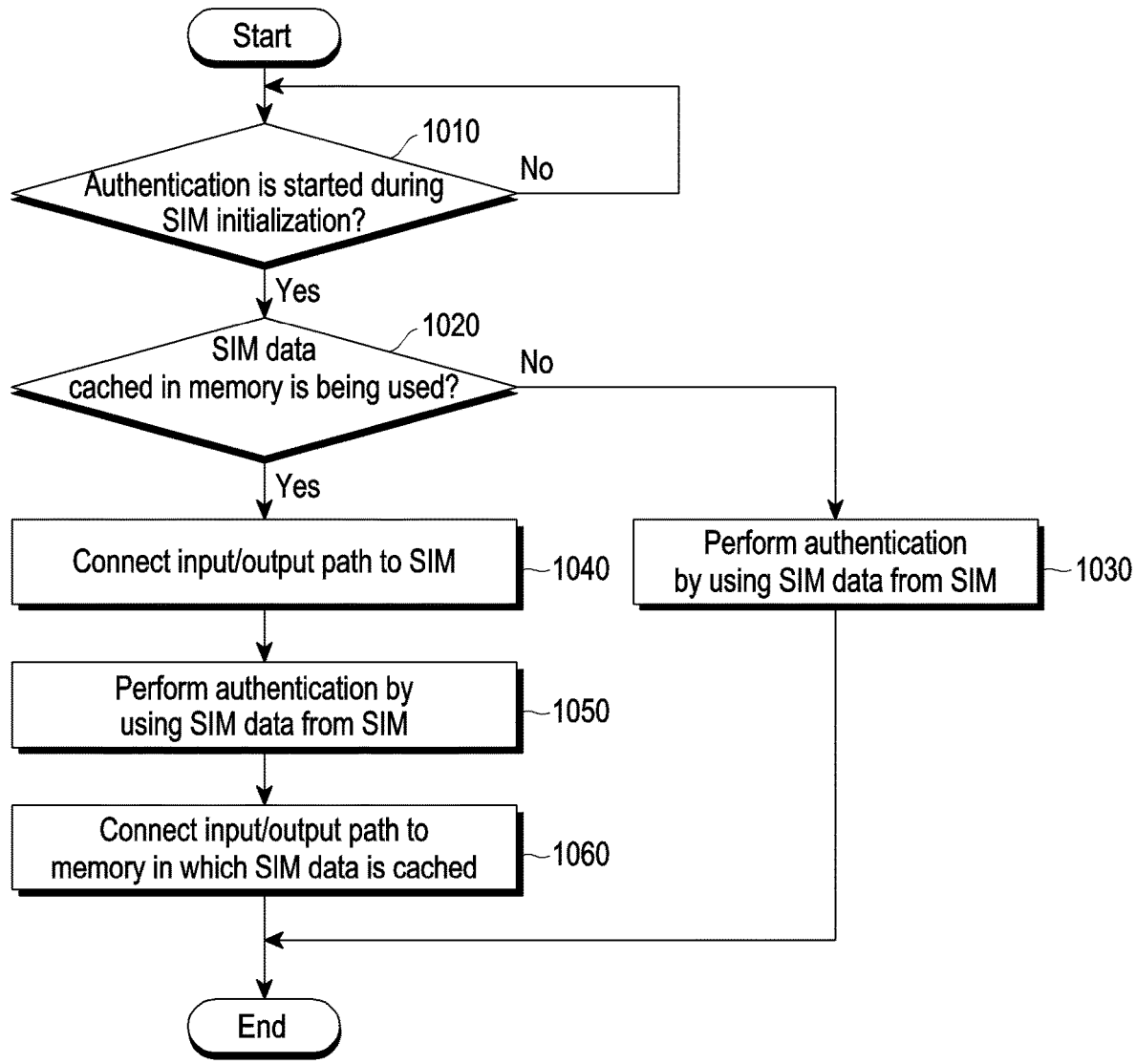
FIG. 10 is flowchart diagram illustrating an example authentication operation based on whether cached SIM data is used in an electronic device according to various embodiments.

FIG. 10 is a flowchart illustrating an example authentication operation based on whether cached SIM data is used in an electronic device according to an embodiment.

Referring to FIG. 10, a processor (e.g., the processor 120 of FIG. 1 or the processor 310 of FIG. 3) (hereinafter, the processor 310 will be described as an example) of an electronic device (e.g., the electronic device 101 of FIG. 1, the electronic device 200 of FIG. 2, or the electronic device 300 of FIG. 3) according to an embodiment may perform a part or all of operations 1010 to 1060.

In operation 1010, the processor 310 according to an embodiment may identify an authentication operation start while SIM initialization is performed.

In operation 1020, when the authentication operation is started while the SIM initialization is performed, the processor 310 according to an embodiment may identify whether SIM data cached in a memory (e.g., the memory 130 of FIG. 1 or the memory 330 of FIG. 3) is being used.

In operation 1030, the processor 310 according to an embodiment may read the SIM data from a SIM and perform authentication when the SIM data cached in the memory 330 is not being used.

In operation 1040, the processor 310 according to an embodiment may control an input/output path so as to be connected from the memory 330 to the SIM when the SIM data cached in the memory 330 is being used.

In operation 1050, the processor 310 according to an embodiment may read the SIM data from the SIM and perform the authentication in a state in which the input/output path is connected to the SIM.

In operation 1060, the processor 310 according to an embodiment may allow the input/output path to be connected again to the memory 330 in which the SIM data is cached, after the authentication is completed, so that an SIM initialization operation continues.

Figure 11:
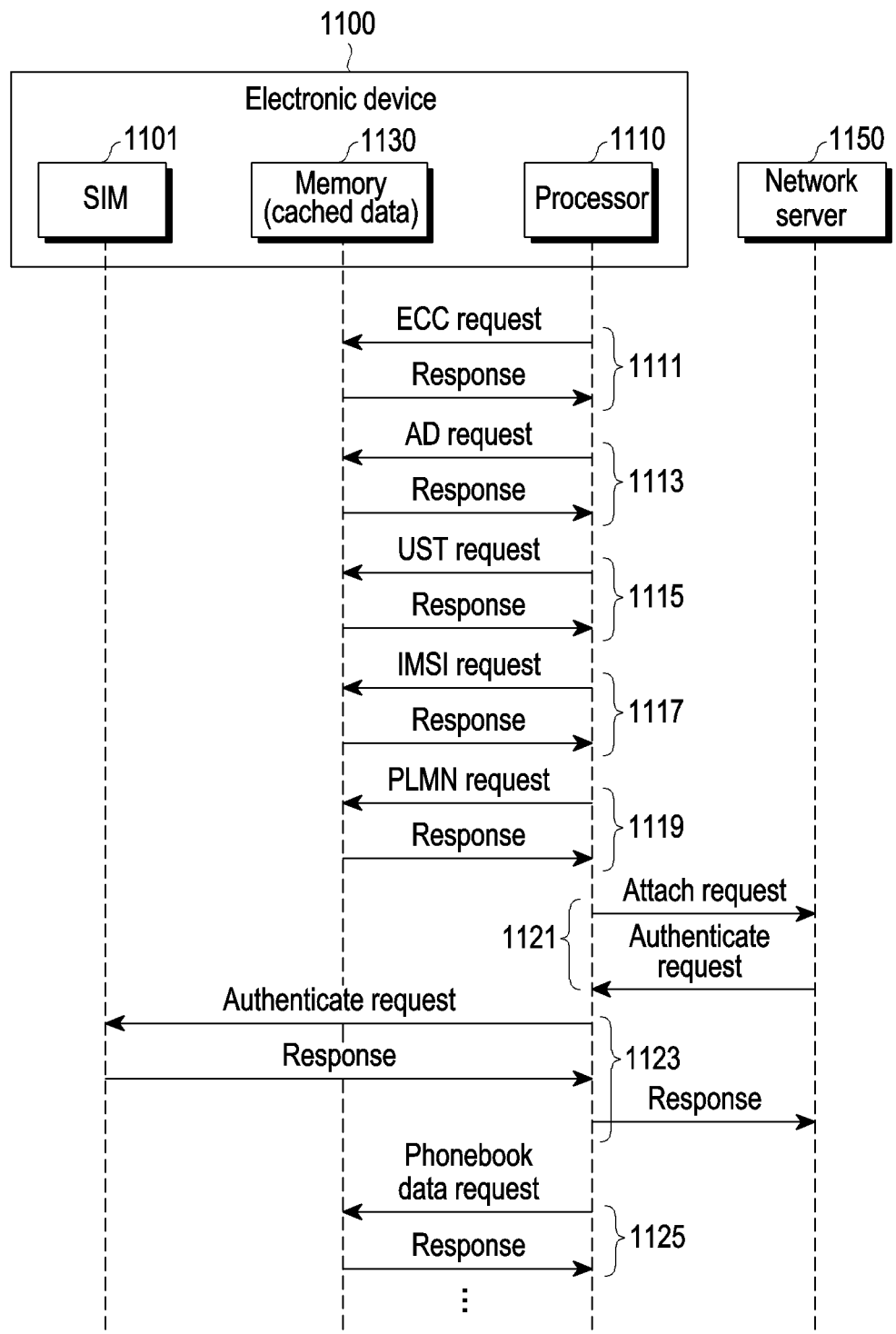
FIG. 11 is a signal flow diagram illustrating an example SIM initialization and authentication operation using cached SIM data in an electronic device according to various embodiments.

FIG. 11 is a signal flow diagram illustrating an example SIM initialization and authentication operation using cached SIM data in an electronic device according to various embodiments.

Referring to FIG. 11, an electronic device 1100 (e.g., the electronic device 101 of FIG. 1, the electronic device 200 of FIG. 2, the electronic device 300 of FIG. 3, or the electronic device 600 of FIG. 6) according to an embodiment may perform SIM initialization using SIM data cached in a memory 1130 without accessing a SIM 1101 (e.g., the subscriber identification module 196 of FIG. 1, the SIM of the subscriber identification module unit 201 of FIG. 2, the SIM of the subscriber identification module unit 301 of FIG. 3, the SIM 414 of FIG. 4A, the SIM1 424, the SIM2 434, or the eSIM 436 of FIG. 4B, or the SIM 601 of FIG. 6), and perform an authentication operation by accessing the SIM 1101 at the time of authentication while performing the SIM initialization. For example, a processor 1110 according to an embodiment may perform a part or all of operations 1111 to 1125.

In operation 1111, the processor 1110 according to an embodiment may request the emergency call codes (ECC) cached in the memory 1130, and receive a response to the cached ECC from the memory 1130.

In operation 1113, the processor 1110 according to an embodiment may request administrative data cached in the memory 1130, and receive a response to the cached administrative data from the memory 1130.

In operation 1115, the processor 1110 according to an embodiment may request a USIM service table cached in the memory 1130, and receive a response to the cached USIM service table from the memory 1130.

In operation 1117, the processor 1110 according to an embodiment may request an IMSI cached in the memory 1130, and receive a response to the cached IMSI from the memory 1130.

In operation 1119, the processor 1110 according to an embodiment may request public land mobile network (PLMN) information cached in the memory 1130, and receive a response to the cached PLMN information from the memory 1130.

In operation 1121, the processor 1110 according to an embodiment may receive an attach request from a network server 1150 using responses (e.g., cached SIM data obtained from the memory 1130) received from the memory 1130, and receive an authentication request from the network server 1150.

In operation 1123, the processor 1110 according to an embodiment may make an authentication request to the SIM 1101 at the time of the authentication request, receive an authentication request response from the SIM 1101, and transmit the authentication request response to the network server 1150 when the authentication request response is received.

In operation 1125, the processor 1110 according to an embodiment may request phonebook data cached in the memory 1130 again when the authentication is completed, and receive a response to the cached phonebook data from the memory 1130. After operation 1125, the processor 1110 may further perform an initialization operation using the SIM data cached in the memory 1130.

Figure 12:
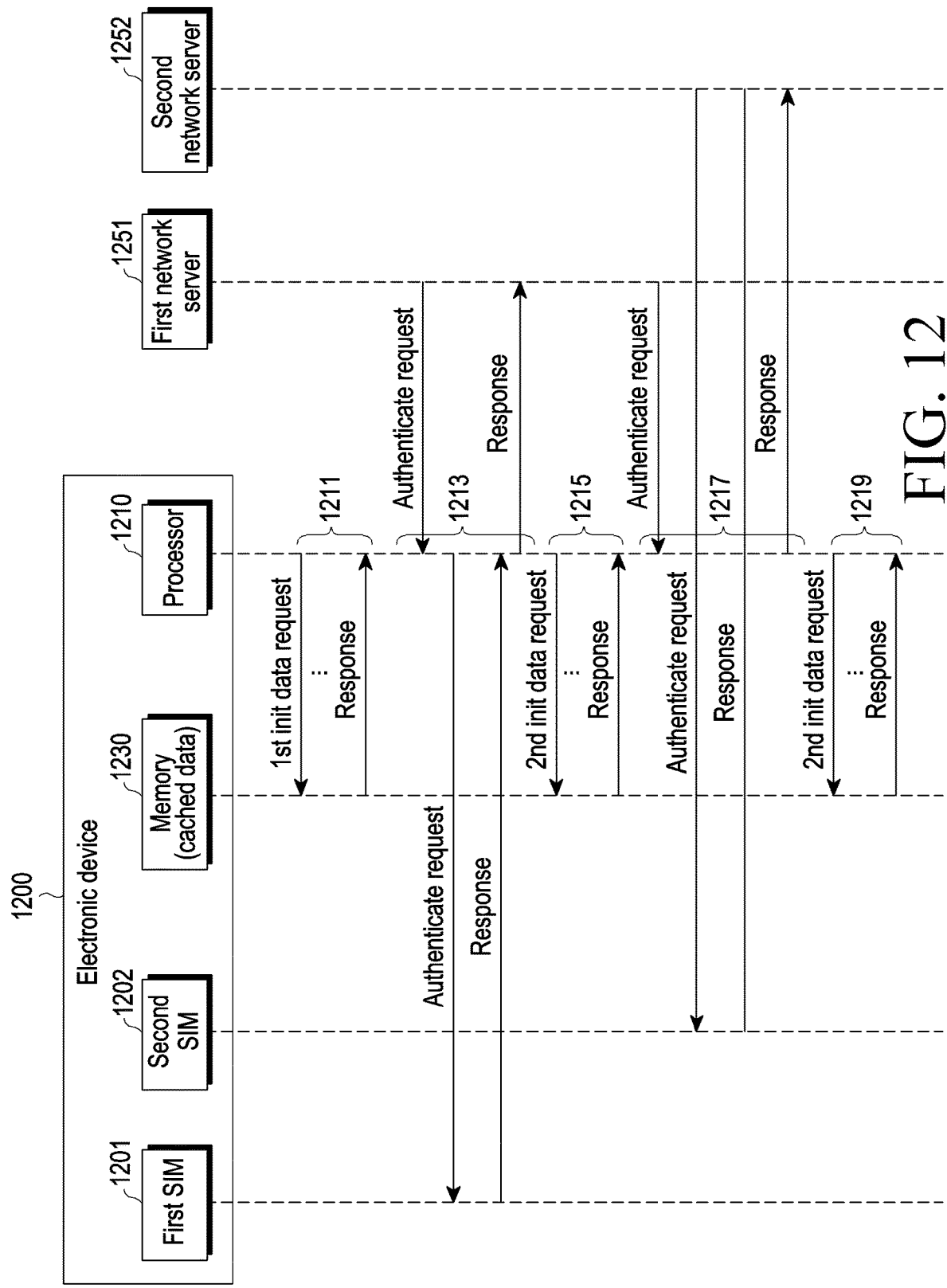
FIG. 12 is a signal flow diagram illustrating an example first SIM initialization and authentication operation and an example second SIM initialization and authentication operation using cached first SIM data and second SIM data in an electronic device according to various embodiments.

FIG. 12 is a signal flow diagram illustrating an example first SIM initialization and authentication operation and a second SIM initialization and authentication operation using cached first SIM data and second SIM data in an electronic device according to various embodiments.

Referring to FIG. 12, an electronic device 1200 (e.g., the electronic device 101 of FIG. 1, the electronic device 200 of FIG. 2, the electronic device 300 of FIG. 3, or the electronic device 600 of FIG. 6) according to an embodiment may perform first SIM initialization or second SIM initialization using first SIM data or second SIM data cached in a memory 1230 without accessing a first SIM 1201 (e.g., the SIM2 434 of FIG. 4B) and a second SIM 1202 (e.g., the eSIM2 436 of FIG. 4B), and perform an authentication operation by accessing the first SIM 1201 or the second SIM 1202 at the time of authentication while performing the first SIM initialization or the second SIM initialization. For example, a processor 1210 according to an embodiment may perform a part or all of operations 1211 to 1219.

In operation 1211, when an initialization event associated with the first SIM 1201 occurs, the processor 1210 according to an embodiment may request first initialization data (e.g., also referred to as first SIM data) cached in the memory 1230, and receive a response to the cached first initialization data from the memory 1130. For example, the first initialization data may include at least one of an ECC, administrative data, a USIM service table, an IMSI, or PLMN information associated with initialization of the first SIM 1201, and further include at least one of information mentioned in the SIM initialization operation of FIG. 6.

In operation 1213, the processor 1210 according to an embodiment may make an authentication request to the first SIM 1201 at the time of the authentication request from a first network server 1251 associated with the first SIM while performing initialization associated with the first SIM, receive an authentication request response from the first SIM 1201, and transmit the authentication request response to the first network server 1251 when the authentication request response is received.

In operation 1215, when an initialization event associated with the second SIM 1202 occurs, the processor 1210 according to an embodiment may request second initialization data (e.g., also referred to as second SIM data) cached in the memory 1230, and receive a response to the cached second initialization data from the memory 1230. For example, the second initialization data may include at least one of an ECC, administrative data, a USIM service table, an IMSI, or PLMN information associated with initialization of the second SIM 1202, and further include at least one of information mentioned in the SIM initialization operation of FIG. 6.

In operation 1217, the processor 1210 according to an embodiment may make an authentication request to the second SIM 1202 at the time of the authentication request from a second network server 1252 associated with the second SIM while performing initialization associated with the second SIM, receive an authentication request response from the second SIM 1202, and transmit the authentication request response to the second network server 1252 when the authentication request response is received.

In operation 1219, when the authentication is completed, the processor 1210 according to an embodiment may request the second initialization data (e.g., phonebook data) cached in the memory 1230 again, and receive a response to the cached second initialization data (e.g., phonebook data) from the memory 1230.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a non-transitory computer-readable storage medium has stored thereon commands, the commands, when executed by at least one processor, cause the at least one processor to perform at least one operation, the at least one operation including: identifying whether first subscriber identification module (SIM) data cached in a memory being valid in association with information for providing a first communication service of a first SIM when initializing based on the first SIM; based on the cached first SIM data being valid, performing initialization associated with the first SIM using the cached first SIM data; and based on the cached first SIM data not being valid, performing the initialization based on the first SIM using first SIM data associated with the information for providing the first communication service from the first SIM.

In addition, the embodiments of the disclosure disclosed in the disclosure and drawings provide examples to easily describe the technical content according to various embodiments of the disclosure and to help understanding of the disclosure, and are not intended to limit the scope of the disclosure. Therefore, the scope of various embodiments of the disclosure should be interpreted to include all changes or modified forms derived based on the technical idea of the various embodiments of the disclosure in addition to the embodiments disclosed herein and including the appended claims and their equivalents. It will also be understood that any of the embodiment(s) described herein may be used in conjunction with any other embodiment(s) described herein.

What is claimed is:
1. An electronic device comprising:
a communication circuit;
a first subscriber identification module (SIM) comprising subscriber identification circuitry and including information for providing a first communication service;
a memory; and
at least one processor operatively connected to the communication circuit, the first SIM, and the memory,
wherein the memory stores instructions which, when executed by the at least one processor, individually and/or collectively, cause the electronic device to:
identify whether first SIM data cached in the memory is valid in association with the information for providing the first communication service of the first SIM based on information indicating whether the whether first SIM data cached in the memory is valid, when initializing based on the first SIM,
based on the cached first SIM data being valid, perform initialization associated with the first SIM via the communication circuit using the cached first SIM data, and
based on the cached first SIM data not being valid, perform the initialization associated with the first SIM via the communication circuit using first SIM data associated with the information for providing the first service from the first SIM,
wherein the instructions, when executed by the at least one processor, individually and/or collectively, cause the electronic device further to:
configure the information indicating whether the whether first SIM data cached in the memory is valid to indicate that first SIM data cached in the memory is invalid in case that a profile associated with the first SIM is not in the first SIM;
configure the information indicating whether the whether first SIM data cached in the memory is valid to indicate that first SIM data cached in the memory is invalid in case that the profile associated with the first SIM is downloaded in the first SIM and not activated; and
configure the information indicating whether the whether first SIM data cached in the memory is valid to indicate that first SIM data cached in the memory is valid in case that the profile associated with the first SIM is downloaded in the first SIM and activated.

2. The electronic device of claim 1, wherein the instructions, when executed by the at least on processor, individually and/or collectively, cause the electronic device to:
change an input/output path for authentication from the memory to the first SIM while performing the initialization associated with the first SIM using the cached first SIM data, and perform the authentication operation using the first SIM data from the first SIM.

3. The electronic device of claim 2, wherein the instructions, when executed by the at least on processor, individually and/or collectively, cause the electronic device to:
based on the authentication operation being completed, change the input/output path from the first SIM to the memory.

4. The electronic device of claim 1, further comprising a second SIM including information for providing a second communication service,
wherein the instructions, when executed by the at least on processor, individually and/or collectively, cause the electronic device to:
identify whether cached second SIM data being valid in association with the information for providing the second communication service of the second SIM when initializing based on the second SIM, based on the cached second SIM data being valid, perform initialization associated with the second SIM using the cached second SIM data, and based on the cached second SIM data not being valid, perform the initialization associated with the second SIM using second SIM data associated with the information for providing the second communication service from the second SIM.

5. The electronic device of claim 4, wherein the instructions, when executed by the at least on processor, individually and/or collectively, cause the electronic device to:
change an input/output path for authentication from the memory to the second SIM while performing the initialization associated with the second SIM using the cached second SIM data, and perform the authentication operation using the second SIM data from the second SIM.

6. The electronic device of claim 4, further comprising a SIM driver,
wherein the instructions, when executed by the at least on processor, individually and/or collectively, cause the electronic device to:
control the SIM driver to activate one of the first SIM and the second SIM.

7. The electronic device of claim 4, wherein each of the first SIM and the second SIM comprises a plastic SIM (pSIM) or an embedded SIM (eSIM).

8. A method for using cached data based on subscriber identification information in an electronic device, the method comprising:
identifying whether first subscriber identification module (SIM) data cached in a memory is valid in association with information for providing a first communication service of a first SIM based on information indicating whether the whether first SIM data cached in the memory is valid, when initializing based on the first SIM;

based on the cached first SIM data being valid, performing initialization associated with the first SIM using the cached first SIM data; and based on the cached first SIM data not being valid, performing the initialization associated with the first SIM using first SIM data associated with the information for providing the first communication service from the first SIM, wherein the method further comprises:

configuring the information indicating whether the whether first SIM data cached in the memory is valid to indicate that first SIM data cached in the memory is invalid in case that a profile associated with the first SIM is not in the first SIM;

configuring the information indicating whether the whether first SIM data cached in the memory is valid to indicate that first SIM data cached in the memory is invalid in case that the profile associated with the first SIM is downloaded in the first SIM and not activated; and configuring the information indicating whether the whether first SIM data cached in the memory is valid to indicate that first SIM data cached in the memory is valid in case that the profile associated with the first SIM is downloaded in the first SIM and activated.

9. The method of claim 8, further comprising:

changing an input/output path for authentication from the memory to the first SIM while performing the initialization associated with the first SIM using the cached first SIM data; and performing the authentication operation using the first SIM data from the first SIM.

10. The method of claim 9, further comprising changing the input/output path from the first SIM to the memory based on the authentication operation being completed.

11. The method of claim 8, further comprising:

identifying whether cached second SIM data being valid in association with information for providing a second communication service of a second SIM when initializing based on the second SIM;

based on the cached second SIM data being valid, performing initialization associated with the second SIM using the cached second SIM data; and based on the cached second SIM data not being valid, performing the initialization associated with the second SIM using second SIM data associated with the information for providing the second communication service from the second SIM.

12. The method of claim 11, further comprising:

changing an input/output path for authentication from the memory to the second SIM while performing the initialization associated with the second SIM using the cached second SIM data; and performing an authentication operation using the second SIM data from the second SIM.

13. The method of claim 11, further comprising:

controlling a SIM driver to activate one of the first SIM and the second SIM.

14. The method of claim 11, each of the first SIM and the second SIM comprises be a plastic SIM (pSIM) or an embedded SIM (eSIM).

15. A non-transitory computer-readable storage medium having stored thereon commands, the commands, when executed by at least one processor of an electronic device, individually and/or collectively, cause the at electronic device to perform at least one operation, the at least one operation comprising:

identifying whether first subscriber identification module (SIM) data cached in a memory is valid in association with information for providing a first communication service of a first SIM based on information indicating whether the whether first SIM data cached in the memory is valid, when initializing based on the first SIM;

based on the cached first SIM data being valid, performing initialization associated with the first SIM using the cached first SIM data; and based on the cached first SIM data not being valid, performing the initialization based on the first SIM using first SIM data associated with the information for providing the first communication service from the first SIM, wherein the at least one operation further comprises:

configuring the information indicating whether the whether first SIM data cached in the memory is valid to indicate that first SIM data cached in the memory is invalid in case that a profile associated with the first SIM is not in the memory;

configuring the information indicating whether the whether first SIM data cached in the memory is valid to indicate that first SIM data cached in the memory is invalid in case that the profile associated with the first SIM is downloaded in the memory and not activated; and configuring the information indicating whether the whether first SIM data cached in the memory is valid to indicate that first SIM data cached in the memory is valid in case that the profile associated with the first SIM is downloaded in the first SIM and activated.

* * * * *